US010882875B2

(12) United States Patent
Gorecki et al.

(10) Patent No.: US 10,882,875 B2
(45) Date of Patent: Jan. 5, 2021

(54) PROCESS FOR THE PREPARATION OF A TRIARYL PHOSPHATE ESTER COMPOSITION

(71) Applicant: PCC ROKITA SA, Brzeg Dolny (PL)

(72) Inventors: Lukasz Gorecki, Piece (PL); Grzegorz Janus, Brzeg Dolny (PL); Uwe Storzer, Tubingen (DE)

(73) Assignee: PCC ROKITA SA, Brzeg Dolny (PL)

( * ) Notice: Subject to any disclaimer, the term of this patent is extended or adjusted under 35 U.S.C. 154(b) by 0 days.

(21) Appl. No.: 15/999,341

(22) PCT Filed: Feb. 13, 2017

(86) PCT No.: PCT/EP2017/053115
§ 371 (c)(1),
(2) Date: Aug. 17, 2018

(87) PCT Pub. No.: WO2017/140609
PCT Pub. Date: Aug. 24, 2017

(65) Prior Publication Data
US 2019/0040088 A1 Feb. 7, 2019

(30) Foreign Application Priority Data
Feb. 18, 2016 (EP) .................................. 16156352

(51) Int. Cl.
| C07F 9/09 | (2006.01) |
| C09K 21/12 | (2006.01) |
| C08K 5/521 | (2006.01) |
| C10M 137/04 | (2006.01) |
| C08K 5/523 | (2006.01) |
| C10N 30/06 | (2006.01) |
| C10N 70/00 | (2006.01) |

(52) U.S. Cl.
CPC .............. *C07F 9/09* (2013.01); *C08K 5/521* (2013.01); *C08K 5/523* (2013.01); *C09K 21/12* (2013.01); *C10M 137/04* (2013.01); *C10M 2223/041* (2013.01); *C10N 2030/06* (2013.01); *C10N 2070/00* (2013.01)

(58) Field of Classification Search
CPC ........... C07F 9/09; C09K 21/12; C08K 5/521
See application file for complete search history.

(56) References Cited

U.S. PATENT DOCUMENTS

| 3,076,010 A | 1/1963 | Beck et al. |
| 8,575,225 B2 * | 11/2013 | Layman, Jr. ........... C08J 9/0038 521/107 |
| 2018/0223032 A1 | 8/2018 | Tomczak et al. |

FOREIGN PATENT DOCUMENTS

| JP | 2013023580 | 2/2013 |
| WO | 1992/002567 | 2/1992 |
| WO | 2013/101524 | 7/2013 |
| WO | 2017/029337 | 2/2017 |

OTHER PUBLICATIONS

PubChem CID 8289—National Center for Biotechnology Information. PubChem Database. Triphenyl phosphate, CID=8289, https://pubchem.ncbi.nlm.nih.gov/compound/Triphenyl-phosphate (accessed on Jul. 9, 2019), create date Mar. 26, 2005. (Year: 2005).*
Donghwan, Yoon et al., "Dynamics and Mechanism of Flame Retardants in Polymer Matrixes: Experiment and Simulation", Journal of Physical Chemisty B, vol. 117, No. 28, Jun. 24, 2013, pp. 8571-8578.
International Search Report for PCT/EP2017/053115 dated Apr. 7, 2017.
Written Opinion of the International Searching Authority for PCT/EP2017/053115 dated Apr. 7, 2017.
International Preliminary Report on Patentability for PCT/EP2017/053115 dated May 24, 2018.
International Preliminary Report on Patentability for PCT/EP2016/069536 dated Mar. 1, 2018.
International Search Report for PCT/EP2016/069536 dated Nov. 10, 2016.
Written Opinion of the International Searching Authority for PCT/EP2016/069536 dated Nov. 10, 2016.

* cited by examiner

*Primary Examiner* — Laura L Stockton
(74) *Attorney, Agent, or Firm* — Honigman LLP; Andrew N. Weber; Jonathan P. O'Brien

(57) ABSTRACT

The invention relates to a process for the preparation of a triaryl phosphate ester composition comprising a. reacting a phosphorous oxyhalide with a ($C_1$-$C_{15}$-alkyl)phenol to obtain a first product; b. reacting the first product with phenol to obtain a triaryl phosphate ester composition; wherein in step a., for every mol of phosphorous oxyhalide 1.3 to 1.6 mols of ($C_1$-$C_{15}$-alkyl)phenol are used. The invention also relates to a triaryl phosphate ester composition obtainable according to the process of the invention.

16 Claims, No Drawings

PROCESS FOR THE PREPARATION OF A TRIARYL PHOSPHATE ESTER COMPOSITION

The invention relates to a process for the preparation of a triaryl phosphate ester composition.

Triaryl phosphate esters, in particular alkylated triaryl phosphate esters such as tert-butylphenyl phenyl phosphate esters, are often used as plasticizers or as flame retardants, for example in vinyl chloride polymers, polyolefins, cellulose esters, polyurethane foams, styrenic polymers, and other synthetic polymers. Triaryl phosphate esters are also used in fluids, for example for ignition control in hydraulic fluids or fuels, and as extreme pressure additives in lubricants. Triaryl phosphate esters are suitable for these applications due to their high resistivity to oxidative, thermal, and hydrolytic degradation. For the flame retardant properties of triaryl phosphate esters, a high phosphorous content is important.

Typically, triaryl phosphate esters also contain triphenyl phosphate (TPP). In fact, today's commercially available aryl phosphate ester products typically contain 30 to 45 wt. % triphenyl phosphate ester. TPP possesses a substantial toxicological and ecotoxocological potential and has therefore recently been classified as an environmental hazardous substance (UN 3082) as well as a marine pollutant. Besides, TPP is known to be a mild cholinesterase inhibitor. Analytical results show a statistically significant reduction in red blood cell cholinesterase activity in rats (Bingham, E.; Cohrssen, B.; Powell, C. H.; Patty's Toxicology Volumes 1-9, 5th ed., John Wiley & Sons New York, N.Y. (2001), V6, p. 967). Therefore, triaryl phosphate esters with reduced TPP content are desirable.

Moreover, the physical properties of the triaryl phosphate esters are determined by the degree of alkylation of the aryl groups and the number of alkylated aryl groups in the triaryl phosphate ester or the phosphate ester composition. For example, a highly substituted triaryl phosphate ester, such as one with two or three alkylated aryl groups and/or more than one alkyl substituent per aryl group, is more viscous than a less substituted triaryl phosphate ester. Further, an increasing alkylation degree of the aryl groups decreases the phosphorous content of the product mixture, resulting in poorer flame retardant properties.

Triaryl phosphate esters can be formed by a number of methods commonly used in the art. U.S. Pat. No. 2,275,041 describes the preparation of a mixed aromatic triaryl phosphate ester by reacting a phenol substituted with an allyl-type group with an aromatic phosphoric acid halide such as diphenyl phosphoric acid monochloride. However, the preparation of such defined triaryl phosphate ester compounds requires the use of expensive reagents and/or purification steps.

Other approaches aim at the preparation of mixtures of triaryl phosphate esters. In these approaches, phenol is alkylated with alkenes such as propylene or isobtylene to obtain a mixture of phenol and substituted phenols in a first step. According to U.S. Pat. No. 4,093,680, this mixture of alkylated phenols is then reacted in a second step with phosphorous oxychloride to form a mixed triaryl phosphate ester. The product mix is a statistical mixture based on the composition of the starting alkylated phenol mixture and always includes some fraction of triphenyl phosphate, usually from 5 to 50 wt. %. A typical composition of a tert-butylphenyl phenyl phosphate ester composition contains 1 to 3 wt. % tris(tert-butylphenyl)phosphate, 12 to 18 wt. % bis(tert-butylphenyl)phenyl phosphate, 40 to 46 wt. % tert-butylphenyl diphenyl phosphate, and 30 to 45 wt. % TPP. Such high TPP contents are, however, undesirable for the above-mentioned reasons.

Attempts to reduce the amount of TPP in triaryl phosphate ester compositions have been undertaken. However, when attempting to decrease the levels of TPP in the triaryl phosphate ester composition by fractional distillation, the resulting products show discoloration and increased acidity levels, as described in U.S. Pat. No. 5,206,404, which indicates partial degradation of the products.

U.S. Pat. No. 5,206,404 describes an additional workup step of the crude reaction mixture by thin film evaporation at a temperature from 200° C. to 250° C. and a pressure of less than 5 kPa, such that 5 to 30% of the composition to be purified are evaporated as vapor. The resulting composition contains a high concentration of trialkylphenyl phosphate esters and dialkylphenyl phosphate esters. This, however, reduces the phosphorous content of the product mixture and increases the viscosity as described above.

U.S. Pat. No. 6,242,631 describes two alternatives for the preparation of a mixed triaryl phosphate ester composition. In the first alternative, phosphorous oxychloride ($POCl_3$) is reacted with a high purity alkylated phenol in a quantity sufficient to exhaust at least one functionality of the $POCl_3$ followed by reaction with phenol. According to the examples, a slight excess of less than 0.1 equivalents of the alkalyted phenol is used in the reaction with the $POCl_3$. The resulting phosphate ester compositions contain 3.2 to 4.4 wt. % TPP, respectively, according to the examples and are obtained in yields of at most 94%. In the second alternative, diphenyl monochlorophosphate or a mixture of diphenyl monochlorophosphate and phenyl dichlorophosphate are reacted with a high purity alkylated phenol. While the second alternative can provide for compositions that are substantially free from TPP, the required phosphorous reagents, especially the phenylchlorophosphates are expensive and difficult to source in amounts of industrial scale.

US 2012/0004438 A1 also describes two alternatives for the preparation of triaryl phosphate ester compositions. In the first alternative, an excess of up to 100% of $POCl_3$ is reacted with an alkylated phenol, followed by distillation of the unreacted $POCl_3$ and subsequent reaction of the first reaction product with an alcohol such as an aryl alcohol. In the second alternative, an excess of an alkylated phenol is reacted with $POCl_3$ followed by reaction with another alcohol, preferably phenol. Additional refinement of the phosphate ester composition is optional and includes distillation as an alternative. According to the examples, multiple washing steps, including use of additional solvents (i.e. toluene), generating problematic waste streams, followed by an evaporation step and a flash distillation step are conducted in the second alternative. All operations decrease the yield to only 93% and increase the overall cost of the process.

The processes described so far all have drawbacks such as a high TPP content in the final product mixture, the use of expensive reagents or solvents, low overall yields, a low phosphorous content in the product mixture, and/or distillation and/or evaporation steps during the phosphorylation process and/or in the work-up.

Therefore, it was an object of the invention, to provide a process that yields a triaryl phosphate ester composition with a low TPP content, in particular with a TPP content of 0.5 wt. % or less, based on the total weight of the triaryl phosphate ester composition, and/or with a high overall yield. It was another object of the invention to provide a process that relies on common starting materials, which are easily accessible on the market. It was another object of the invention to provide a process that yields a composition with a high phosphorous content. It was another object of the invention to provide a process with a reduced amount of waste streams and/or a reduced number of distillation and/or evaporation steps.

Some or all of these objects can be achieved by using the present invention. In particular, some or all of these objects can be achieved by the process set forth in the claims.

Further embodiments are described in the dependent claims and will be discussed in the following.

The invention provides for a process for the preparation of a triaryl phosphate ester composition comprising
a. reacting a phosphorous oxyhalide with a ($C_1$-$C_{15}$-alkyl) phenol to obtain a first product;
b. reacting the first product with phenol to obtain a triaryl phosphate ester composition;
wherein
in step a., for every mol of phosphorous oxyhalide 1.3 to 1.6 mols of ($C_1$-$C_{15}$-alkyl)phenol are used.

Surprisingly, it has been found that as a result of using 1.3 to 1.6 mols of ($C_1$-$C_{15}$-alkyl)phenol for every mol of phosphorous oxyhalide, a process was obtained that provides a triaryl phosphate ester composition in very good overall yields, in particular in yields above 95%, with a low TPP content and/or a low tris(alkylphenyl) phosphate ester content, in particular with a TPP content of 0.5 wt. % or less and/or a tris(alkylphenyl) phosphate ester content of 3 wt. % or less, in each case based on the total weight of the triaryl phosphate ester composition. Particularly, with the process according to the invention, common starting materials can be used and/or the number of evaporation and/or distillation steps can be reduced. Moreover, the use of solvents can be reduced.

Without wishing to be bound by a scientific theory, it appears that the use of 1.3 to 1.6 mols of ($C_1$-$C_{15}$-alkyl) phenol for every mol of phosphorous oxyhalide aids in achieving very good overall yields as well as in suppressing the formation of TPP. Surprisingly, it was also found that the resulting triaryl phosphate ester compositions had a good phosphorous content despite the use of up to 1.6 mols of ($C_1$-$C_{15}$-alkyl)phenol for every mol of phosphorous oxyhalide in the reaction. This was unexpected, since one would expect low phosphorous contents of the compositions due to the use of the excess of the ($C_1$-$C_{15}$-alkyl)phenol.

Phosphorous oxyhalides are also known as phosphoryl trihalides. Examples for phosphorous oxyhalides or phosphoryl trihalides are phosphorous oxychloride (phosphoryl trichloride, $POCl_3$), phosphorous oxybromide (phosphoryl tribromide, $POBr_3$), and phosphorous oxyiodide (phosphoryl triiodide, $POI_3$).

The steps a. and b. of the present invention may be catalyzed to accelerate the reaction. As catalysts, different compounds can be used. Preferably, steps a. and b. of the invention are catalyzed by a Lewis acid. Non-limiting examples of Lewis acids include aluminum halides, sodium halides, potassium halides, lithium halides, magnesium halides, calcium halides, iron halides, zinc halides, titanium halides, and antimony halides. Preferred Lewis acids include $AlCl_3$, $NaCl$, $KCl$, $LiCl$, $MgCl_2$, $CaCl_2$, $FeCl_3$, $ZnCl_2$, $TiCl_4$, and $SbCl_4$. According to a preferred embodiment, steps a. and b. of the invention are catalyzed by a magnesium halide, preferably $MgCl_2$. Mixtures of Lewis acids may also be used. It was discovered that these catalysts are particularly effective at accelerating the reaction. Moreover, these catalysts, in particular $MgCl_2$, are inexpensive.

If a Lewis acid is used to catalyze steps a. and b. of the invention, it can be added as such or it can be prepared in situ. In particular, the Lewis acid can be added to the reaction vessel or be prepared in the reaction vessel before step a. According to an embodiment of the invention, the Lewis acid, in particular $MgCl_2$, and the ($C_1$-$C_{15}$-alkyl) phenol are put into the reaction vessel first in a step before step a. In this embodiment, the Lewis acid can be put in first or the ($C_1$-$C_{15}$-alkyl)phenol can be put in first, which simplifies the handling significantly. According to another embodiment, a Lewis acid precursor, in particular magnesium, and the ($C_1$-$C_{15}$-alkyl)phenol are put into the reaction vessel first in a step before step a. Thereby, the Lewis acid can be formed in situ when adding the phosphorous oxyhalide. In this embodiment, the Lewis acid precursor can be added to the ($C_1$-$C_{15}$-alkyl)phenol or the ($C_1$-$C_{15}$-alkyl) phenol can be added to the Lewis acid precursor. Preferably, the Lewis acid precursor is added to the ($C_1$-$C_{15}$-alkyl) phenol. According to a preferred embodiment, the magnesium halide is prepared by heating the reaction mixture, comprising magnesium and the ($C_1$-$C_{15}$-alkyl)phenol in the presence of an initial portion of phosphorous oxyhalide in a step prior to step a. This allows for an economic process.

The catalyst is preferably used in an amount of 0.001 to 0.1 mol %, more preferably 0.005 to 0.05 mol %, even more preferably 0.008 to 0.015 mol %, in each case based on the amount of phosphorous oxyhalide used. Removal of these amounts of the catalyst has been found to be simple.

As mentioned above, different phosphorous oxyhalides are known. Preferably, in the process according to the invention, the phosphorous oxyhalide is phosphorous oxychloride ($POCl_3$). This allows for an economic process.

In the process according to the invention, a ($C_1$-$C_{15}$-alkyl) phenol is reacted with a phosphorous oxyhalide to yield a first product. Advantageously, the ($C_1$-$C_{15}$-alkyl)phenol is a phenol substituted with a single $C_1$-$C_{15}$ alkyl group. The $C_1$-$C_{15}$ alkyl group of the ($C_1$-$C_{15}$-alkyl)phenol may be in ortho-position, meta-position, or para-position of the phenol ring. Preferably, the $C_1$-$C_{15}$ alkyl group of the ($C_1$-$C_{15}$-alkyl)phenol is in para-position of the phenol ring. Advantageously, the $C_1$-$C_{15}$ alkyl group of the ($C_1$-$C_{15}$-alkyl) phenol is a $C_1$-$C_{10}$-alkyl group, more preferably a $C_1$-$C_7$-alkyl group, more preferably a $C_1$-$C_5$-alkyl group. More preferably the $C_1$-$C_{15}$ alkyl group of the ($C_1$-$C_{15}$-alkyl) phenol is selected from the group consisting of methyl-, ethyl-, propyl-, n-propyl-, iso-propyl-, butyl-, n-butyl-, iso-butyl-, tert-butyl-, pentyl-, n-pentyl-, tert-pentyl-, neopentyl-, isopentyl-, 1-methylbutyl-, and 1-ethylpropyl. According to a preferred embodiment, the ($C_1$-$C_{15}$-alkyl)phenol is tert-butylphenol, in particular p-tert-butylphenol. It was discovered that with these ($C_1$-$C_{15}$-alkyl)phenols, in particular with p-tert-butylphenol, triaryl phosphate ester compositions with particularly good properties, in particular concerning their viscosities, can be obtained in an economical fashion.

In the process according to the invention, the reactants can be added in different order and/or fashion. For example for the reaction of step a., the reactants can be added in one portion or in smaller portions, for example dropwise. Further, the addition can be conducted at different temperatures, for example at room temperature or at higher temperatures such as from 75 to 105° C. Preferably, the addition is conducted at 75 to 105° C. Moreover, the phosphorous oxychloride can be added to the ($C_1$-$C_{15}$-alkyl)phenol or the ($C_1$-$C_{15}$-alkyl)phenol can be added to the phosphorous oxychloride. For the reaction of step a., the phosphorous oxychloride is preferably added dropwise to a mixture of the ($C_1$-$C_{15}$-alkyl)phenol and the catalyst at 75 to 105° C., preferably at 85 to 95° C. This allows for a good reaction control.

The amount of phenol required for a complete exhaustion of the halide functionalities of the phosphorous oxyhalide in step b. can be determined by calculating the stoichiometric amount based on the amount of ($C_1$-$C_{15}$-alkyl)phenol used in step a. According to a preferred embodiment of the invention, the amount of phenol required in step b. is determined by analyzing the contents of the reaction mixture, in particular by analyzing the chloride anion concentration of the reaction mixture. Different methods are known to the skilled person for analyzing the chloride anion concentration of a solution. For example, the chloride anion concentration of a solution can be analyzed using Mohr's method, in particular by titrating the solution in the presence of a chromate indicator with a silver nitrate solution of known concentration. According to the invention, the contents of the reaction mixture, in particular the chloride anion concentration in the reaction mixture, are preferably analyzed and/or determined after a first amount of phenol was added to the first reaction product. Preferably the first amount of phenol is a partial amount of the stoichiometric amount required for a complete exhaustion of the halide functionalities of the phosphorous oxyhalide and calculated based on the amount of ($C_1$-$C_{15}$-alkyl)phenol used in step a. It has been found that during step a., a part of the phosphorous oxyhalide may be carried away from the reaction mixture without having reacted together with the evolving hydrogen halide. For this reason, a substoichiometric amount of phenol may be sufficient in step b. By determining the chloride anion concentration, the amount of phenol required in step b. can be very precisely determined, which helps to reduce the amount of TPP formed and also to render the process more economic.

Step a. of the present invention can be conducted at different temperatures. Preferably, step a. is conducted at 90 to 145° C., more preferably at 100 to 140° C. This allows for a fast reaction.

The phenol can be added at different temperatures to the first reaction product. Preferably, phenol is added at 80 to 120° C., more preferably at 90 to 110° C. This may require cooling of the reaction mixture after step a. Preferably, the reaction mixture is cooled to 90 to 110° C. after step a. This allows for a better reaction control and may help to avoid side product formation.

Step b. of the present invention can be conducted at different temperatures. Preferably, step b. is conducted at 120 to 180° C., more preferably at 130 to 170° C. This allows to achieve high overall yields without significant side product formation.

In order to ensure complete conversion in the steps of the process according to the invention, the reactions of the individual steps are conducted for a certain time. Advantageously, the reaction in step a. of the process of the invention is conducted for 0.5 to 7 hours, in particular 0.5 to 4 hours. This helps to achieve low TPP contents. Preferably the reaction in step b. of the process of the invention is conducted for 8 to 13 hours. This allows to achieve high overall yields.

The first reaction product of step a. can be used directly in step b. or it can be isolated, for example in combination with a workup and/or a purification step. Preferably, the first product of step a. is used without workup and/or purification in step b. This allows for an economic process and helps to reduce the amount of waste streams.

The triaryl phosphate ester composition obtained after step b. may be used as such or may be further refined, for example to remove undesired compounds, for example unreacted phenol and/or unreacted phenol derivatives. Undesired compounds may be removed by phase separation, stripping, such as steam stripping, and/or distillation. Further refinement of the triaryl phosphate ester composition may include contacting with an ion exchange resin, washing one or more times with an acid, a base, and/or water, pH adjustment, and/or evaporation steps such as passage through a wipe film evaporator.

According to an embodiment of the invention, the triaryl phosphate ester composition obtained after step b. is contacted with an ion exchange resin, preferably with a cationic exchange resin. In this step, demineralized water may be added to the phosphate ester composition in a weight ratio of water:phosphate ester composition of from 1:1 to 1:3, preferably 1:2.

According to another embodiment of the invention, the pH of the triaryl phosphate ester composition is adjusted to 8 to 10, in particular to 8.5 to 9, after it was contacted with the ion exchange resin. In this step, demineralized water may be added to the phosphate ester composition in a weight ratio of water:phosphate ester composition of from 1:1 to 1:3, preferably 1:2. The pH is preferably adjusted using a base, for example an alkali metal hydroxide. Preferably, the process according to the invention comprises only one pH adjustment step.

Additionally, the triaryl phosphate ester composition obtained after step b. may be subjected to an aqueous workup. In this aqueous workup step, demineralized water may be added to the phosphate ester composition in a weight ratio of water:phosphate ester composition of from 1:1 to 1:3, preferably 1:2. Phase separation may be conducted at a temperature from 40 to 80° C., preferably from 50 to 70° C. Preferably, the process according to the invention comprises only one aqueous workup step.

According to another embodiment of the invention, the triaryl phosphate ester composition obtained after step b. is subjected to an evaporation step in order to remove unreacted phenol and/or unreacted phenol derivatives. The evaporation step may be conducted as the last refinement step or earlier.

According to a preferred embodiment of the invention, the triaryl phosphate ester composition obtained after step b. is contacted with water at most three times before a final evaporation step.

According to another embodiment of the invention, the process according to the invention is conducted entirely solvent-free.

The invention also relates to a triaryl phosphate ester composition obtainable by a process according to the invention. In particular, the triaryl phosphate ester compositions obtainable according to the invention may contain 50 to 65 wt. % monoalkylphenyl diphenyl phosphate ester and 35 to 50 wt. % bis(alkylphenyl) phenyl phosphate ester, in each case based on the total weight of the triaryl phosphate ester composition. At the same time, the amount of tris(alkylphenyl) phosphate ester may be from 0.5 to 2 wt. %, based on the total weight of the triaryl phosphate ester composition.

The triaryl phosphate ester compositions according to the invention are useful in different applications. The invention also relates to the use of the triaryl phosphate ester compositions according to the invention as flame retardants in polymers, as extreme pressure additives in lubricants, and/or in functional fluids.

In the following, the invention shall be further explained by examples that are illustrative only and not to be construed as limiting in any way.

Materials:

Phosphorous oxychloride, $POCl_3$ (CAS: 10025-87-3, PCC Rokita S.A., purity >99.7%); p-tert-butylphenol, BP (CAS: 98-54-4, Sigma-Aldrich, purity 99%); phenol (CAS: 108-95-2, PKN Orlen S.A., purity >99.9%); magnesium chloride, $MgCl_2$ (CAS: 7786-30-3, Sigma-Aldrich, purity >95%; sodium hydroxide, NaOH (CAS: 1310-73-2, PCC Rokita S.A., 30% solution in water); cationic exchange resin (CAS: 69011-20-7, Purolite, Purolite C100MBH, 35-65%).

General Procedures:

TABLE 1

Procedures used to determine the density, dynamic viscosity, acid value and chloride anion concentration.

| | |
|---|---|
| Density [g/cm$^3$] 25° C. | PN-C-82057: 2000 |
| Dynamic viscosity [mPas] 25° C. | PN-EN ISO 12058-1: 2005 |
| Acid value [mgKOH/g] | PN-EN ISO 2114: 2005 |
| | PN-81/C-06501 |
| Mohr method to determine the chloride anion concentration [mgCl$^-$/g] | PN-ISO 9297: 1994 |

General Workup Procedure:

The general workup procedure consisted of the following three steps.
1. Demineralization:
    The raw product was stirred at 35° C. for 1 hour with 2 to 5 wt. %, based on the total weight of the raw product, of a cationic exchange resin and demineralized water at a weight ratio of water:raw product=1:2. The cation exchange resin was filtered off at 60° C., and the remaining mixture was left for 0.5 hours to complete phase separation. The aqueous phase was discarded and the organic phase was kept.
2. Neutralization:
    The organic phase from step 1 was mixed anew with demineralized water at a weight ratio of water:raw product=1:2 at 35° C., and the pH of the mixture was adjusted with a 10% aqueous NaOH solution to 8.5 to 9.0. Then the temperature of the mixture was increased to 60° C. and left for 0.5 to 2.0 hours to complete the phase separation. The aqueous phase was discarded and the organic phase was kept.
3. Aqueous workup:
    The organic phase from step 2 was mixed anew with demineralized water at a weight ratio of water:raw product=1:2, and the temperature of the mixture was increased to 60° C. The mixture was left for 0.5 to 2.0 hours to complete the phase separation. Then, residual water and excess phenol were distilled off from the organic phase at 10 to 80 mbar at a temperature between 130 to 170° C.

General Procedure A:

BP and catalyst were mixed together in a 1 L glass reactor, equipped with a mechanic stirrer, a nitrogen inlet tube, a thermometer, a reflux condenser with a gas outlet and a bubble counter under exclusion of air and moisture. $POCl_3$ was added dropwise over a period of 1.5 to 2.0 hours while the temperature was decreased constantly from initial 98° C. to 88° C. The temperature was increased to 115° C. over a period of 1.5 hours and then to 130° C. over a period of 0.5 hours. During these operations approximately 2.0-2.5% of the $POCl_3$ evaporates together with the HCl stream and can be detected in the gas washing liquid. Then the reaction mixture was cooled to 100° C., phenol was added in one portion and then slowly heated again to 155° C. and kept at this temperature for 7.5 hours. After cooling of the mixture to 35° C., the raw product was subjected to the general workup procedure.

General Procedure B:

BP and catalyst were mixed together in a 1 L glass reactor under exclusion of air and moisture, equipped with a mechanic stirrer, a nitrogen inlet tube, a thermometer and a reflux condenser with a gas outlet and a bubble counter connected to a gas washing flask filled with 1 L of water. HCl evolution starts immediately when adding $POCl_3$ dropwise over a period of 1.5 to 2.0 hours while the temperature was decreased constantly from initial 98° C. to 88° C. The temperature was increased to 115° C. over a period of 1.5 hours and then to 130° C. over a period of 0.5 hours. During these operations approximately 2.0-2.5% of the $POCl_3$ evaporates together with the HCl stream and can be detected in the gas washing liquid. Then the reaction mixture was cooled to 100° C., 80 to 85% of the calculated amount of phenol was added in one portion and the resulting mixture was heated slowly to 155° C. and kept at this temperature for 5.5 hours. Then, the reaction mixture was cooled again to 100° C., and after the chloride anion concentration in the reaction mixture was determined by titration of a sample of the reaction mixture using the Mohr method, the required amount of phenol for a complete exhaustion of the chloride functionalities of the $POCl_3$ was added in one portion. The resulting mixture was heated to 155° C. and kept at this temperature for 4.5 hours. After cooling the mixture to 35° C., the raw product was subjected to the general workup procedure.

EXAMPLE 1 (COMPARATIVE)

BP (237.35 g, 1.58 mol) and $MgCl_2$ (1.9 g, 20 mmol) were mixed under exclusion of air and moisture in a 1 L glass reactor, equipped with a mechanic stirrer, a nitrogen inlet tube, a thermometer and a reflux condenser with a gas outlet and a bubble counter, connected to a gas washing flask filled with 1 L of water. After heating the reaction mixture to 105° C., a portion of $POCl_3$ (30.666 g, 0.2 mol) was added quickly and HCL evolution started immediately. The reaction mixture was stirred for another 10 minutes and then cooled down to 95° C. Another portion of $POCl_3$ (275.994 g, 1.8 mol) was added dropwise over a period of 2.5 hours while maintaining the temperature at 95° C. The temperature was increased to 115° C. over 2 hours and then to 130° C. over a period of another 2 hours. During these operations approximately 2.0-2.5% of the $POCl_3$ evaporates together with the HCl stream and can be detected in the gas washing liquid. Then the reaction mixture was cooled to 100° C., and phenol (417.85 g, 4.44 mol) was added in one portion. The resulting mixture was slowly heated to 155° C. and kept at this temperature for 12 hours. After cooling of the mixture to 35° C., the raw product was subjected to the general workup procedure. The triaryl phosphate ester composition was isolated with a yield of 96.5% and typically consisted of 43 wt. % p-tert-butylphenyl diphenyl phosphate, 16 wt. % bis(p-tert-butylphenyl) phenyl phosphate, 2 wt. % tris(p-tert-butylphenyl) phosphate, and 39 wt. % triphenyl phosphate.

EXAMPLE 2

Triaryl phosphate ester compositions were synthesized using the following amounts and general procedures.

TABLE 2

Amounts of starting materials and general procedures used

| Synthesis No. | General Procedure | Amount $POCl_3$ (mass, mols) | Amount BP (mass, mols) | Amount Phenol (mass, mols) | Catalyst (amount) |
|---|---|---|---|---|---|
| 1 | A | 306.66 g, 2.00 mol | 390.57 g, 2.60 mol | 319.97 g, 3.39 mol | $MgCl_2$ (20 mmol) |
| 2 | A | 306.66 g, 2.00 mol | 420.62 g, 2.80 mol | 301.15 g, 3.20 mol | $MgCl_2$ (20 mmol) |
| 3 | A | 306.66 g, 2.00 mol | 450.66 g, 3 mol | 282.33 g, 2.99 mol | $MgCl_2$ (20 mmol) |
| 4 | B | 321.99 g, 2.10 mol | 410.10 g, 2.73 mol | 317.64 g, 3.38 mol | $MgCl_2$ (20 mmol) |
| 5 | B | 321.99 g, 2.10 mol | 441.65 g, 2.94 mol | 296.58 g, 3.15 mol | $MgCl_2$ (20 mmol) |

The reaction products obtained with the syntheses listed above were subsequently analysed concerning their composition as well as their viscosity at 25° C., their density at 25° C., and their acid value.

TABLE 3

Product compositions, viscosity, density, and acid value

| | Product composition [wt. %] | | | | Viscosity at 25° C. mPa * s | Density 25° C. g/cm³ | Acid value mg KOH/g |
|---|---|---|---|---|---|---|---|
| Synthesis No. | p-tert-butylphenyl diphenyl phosphate | bis(p-tert-butylphenyl) phenyl phosphate | tris(p-tert-butylphenyl) phosphate | Triphenyl phosphate | | | |
| 1 | 61.1 | 37.8 | 0.7 | 0.4 | 180 | 1.14 | 0.02 |
| 2 | 56.9 | 41.7 | 1.1 | 0.3 | 210 | 1.13 | 0.01 |
| 3 | 51.0 | 47.2 | 1.6 | 0.2 | 253 | 1.13 | 0.01 |
| 4 | 62.9 | 35.8 | 1.1 | 0.2 | 175 | 1.14 | 0.01 |
| 5 | 52.4 | 45.5 | 2.0 | 0.1 | 207 | 1.13 | 0.01 |

The compositions were isolated with the following yields.

TABLE 4

| Synthesis No. | Yield |
|---|---|
| 1 | 95.5% |
| 2 | 97.0% |
| 3 | 96.5% |
| 4 | 97.5% |
| 5 | 98.0% |

Table 3 shows that using the process according to the invention, triaryl phosphate ester compositions with a triphenyl phosphate content of less than 0.5 wt. % can be obtained from common starting materials that are easily accessible on the market. Moreover, using the chloride anion determination method allows to reduce the TPP content to values as low as 0.1 wt. %, based on the weight of the phosphate ester composition. Further, Table 3 shows that with the process according to the invention, triaryl phosphate ester compositions containing more than 50 wt. % of the monoalkylated aryl phosphate ester, in particular of p-tert-butylphenyl diphenyl phosphate, can be achieved. When compared to comparative Example 1, it can be seen that despite the use of an excess of BP in the syntheses of Example 2, the amount of tris(p-tert-butylphenyl) phosphate is at most as high as in Example 1. Also, using the invention, triaryl phosphate ester compositions can be prepared in essentially solvent-free processes that employ only one evaporation step. Further, Table 4 shows that using the process according to the invention, triaryl phosphate ester compositions can be obtained with more than 95% overall yield.

The invention claimed is:

1. A process for the preparation of a composition comprising a triphenyl and ($C_1$-$C_{15}$-alkyl) substituted triphenyl phosphate ester, the process comprising:
    a. reacting a phosphorous oxyhalide with a ($C_1$-$C_{15}$-alkyl) phenol to obtain a first product; and
    b. reacting the first product with phenol to obtain a triphenyl and ($C_1$-$C_{15}$-alkyl) substituted triphenyl phosphate ester composition; wherein,
    in step a, for every mol of phosphorous oxyhalide 1.3 to 1.6 mols of ($C_1$-$C_{15}$-alkyl)phenol are used,
    in step b, the amount of phenol required is determined by analyzing chloride anion concentration of the reaction mixture,
    steps a and b are catalyzed by a Lewis acid, and
    the phosphorous oxyhalide of step a is phosphorous oxychloride ($POCl_3$).

2. The process of claim 1, wherein the Lewis acid is magnesium halide.

3. The process of claim 2, wherein the magnesium halide is prepared by heating magnesium in the presence of a phosphorous oxyhalide in a step prior to step a.

4. The process of claim 1, ($C_1$-$C_{15}$-alkyl)phenol is tert-butylphenol.

5. The process of claim 1, wherein step a is conducted at 90 to 145° C.

6. The process of claim 1, wherein step b is conducted at 120 to 180° C.

7. The process of claim 5, wherein the reaction mixture is cooled to 90 to 110° C. after step a.

8. The process of claim 1, wherein the reaction in step a is conducted for 0.5 to 7 hours.

9. The process of claim 1, wherein the reaction in step b is conducted for 8 to 13 hours.

10. The process of claim 1, wherein the first product of step a is used without workup and/or purification in step b.

11. The process of claim 1, wherein the chloride anion concentration of the reaction mixture is analyzed and/or determined after a first amount of phenol is added to the first reaction product.

12. The process of claim 1, further comprising contacting the triphenyl and ($C_1$-$C_{15}$-alkyl) substituted triphenyl phosphate ester composition obtained after step b with an ion exchange resin.

13. The process of claim 12, further comprising adjusting the pH of the triphenyl and ($C_1$-$C_{15}$-alkyl) substituted triphenyl phosphate ester composition to 8 to 10 after the triphenyl and ($C_1$-$C_{15}$-alkyl) substituted triphenyl phosphate ester composition is contacted with the ion exchange resin.

14. The process of claim 1, further comprising subjecting the triphenyl and ($C_1$-$C_{15}$-alkyl) substituted triphenyl phosphate ester composition obtained after step b to an aqueous workup.

15. The process of claim 1, further comprising subjecting the triphenyl and ($C_1$-$C_{15}$-alkyl) substituted triphenyl phosphate ester composition obtained after step b to an evaporation step in order to remove unreacted phenol and/or unreacted phenol derivatives.

16. The process of claim 1, wherein the process is conducted entirely free of solvent.

* * * * *